UNITED STATES PATENT OFFICE.

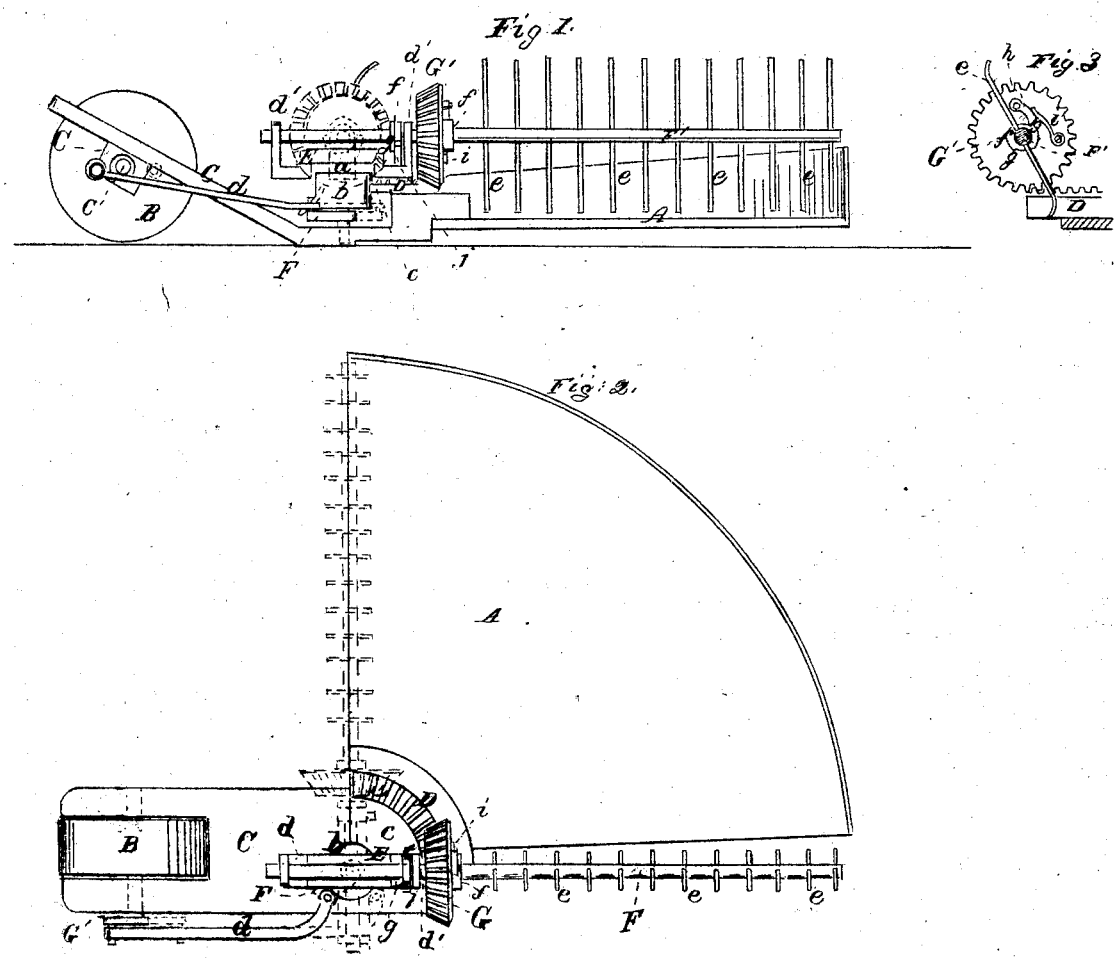

JAMES H. THOMPSON, OF NEWARK, NEW JERSEY.

IMPROVED RAKING ATTACHMENT FOR REAPERS.

Specification forming part of Letters Patent No. 16,342, dated January 6, 1857.

*To all whom it may concern:*

Be it known that I, JAMES H. THOMPSON, of Newark, in the county of Essex and State of New Jersey, have invented a new and Improved Raking Attachment for Reapers; and I do hereby declare that the following is a full, clear, and exact description of the same, reference being had to the annexed drawings, making a part of this specification, in which—

Figure 1 is a side view of my improvement. Fig. 2 is a plan or top view of the same. Fig. 3 is a transverse section of the rake-shaft, showing one side of the toothed wheel on said shaft, the pawl attached to one side of said wheel, and one of the hubs or bosses which are attached to the rake-shaft.

Similar letters of reference indicate corresponding parts in the several figures.

My invention consists in the employment or use of a vibrating and intermittently-rotating shaft, arranged and operated as will be hereinafter fully shown and described, whereby the cut grain is raked from the platform in a perfect manner, and the raking device rendered extremely simple and economical to construct.

To enable those skilled in the art to fully understand and construct my invention, I will proceed to describe it.

A represents the platform of a reaper, and B represents the driving-wheel, which is fitted to the main frame C of the reaper. The platform A is of quadrant or sector form, and a segment-rack, D, is attached to the platform at its angle.

E represents a bar, which has a vertical axis, *a*, attached to it. The axis *a* of this bar passes through a hub or boss, *b*, attached to a plate, *c*, on which the rack D is placed, the rack-plate and hub or boss being cast in one piece, if desired. The axis *a* is allowed to turn freely in the hub or boss *b*, and a crank, F, is attached to its lower end, said crank being connected to a crank, G, on the axle *c′* of the driving-wheel by a rod, *d*. The ends of the bar E are turned up, as shown at *d′ d′*, and a shaft, F′, passes through the ends *d′* of said bar, the ends *d′* forming bearings for the shaft F′. Through the shaft F′ teeth *e* pass pass transversely, said teeth projecting at equal distances from each side of the shaft. A toothed wheel, G′, is placed loosely on the shaft F′, and between the hubs or bosses *f f′*, which are permanently attached to the shaft F′. These hubs or bosses have each two shoulders, *g g*, on them, the shoulders on one hub or boss being clearly shown in Fig. 3.

To one side of the toothed wheel G′ a pawl, *h*, is attached, and the end of this pawl is pressed against the periphery of the hub or boss *f* by a spring, *i*, as shown in Fig. 3.

To the inner bent end *d′* of the bar E a pawl, *j*, is attached, as shown more particularly in Fig. 1. This pawl bears against the periphery of the hub or boss *f′*.

From the above description of parts it will be seen that as the machine is drawn along a vibrating motion is given to the bar E by means of the cranks F G and connecting-rod *d*, and as the shaft F′ has its bearings in the bar E′ a vibrating motion is also communicated to the shaft, the teeth *e* being of such a length that their ends will sweep over the platform just above its surface and rake the cut grain off the platform. As the shaft F′ moves from the front toward the back end of the platform the shaft is prevented from turning in its bearings by the pawl *j′*, which catches against one of the shoulders *g* on the hub *f″*, and the wheel G′ rotates loosely on the shaft; but when the shaft F′ has reached the end of its backward movement, and its forward movement commences, the wheel G′ is connected with the shaft F′, in consequence of the pawl *h* catching against one of the shoulders on the hub or boss *f*, and the shaft F′ will, as it moves forward, be gradually turned one-half of a revolution, so that when the shaft has reached the termination of its forward movement the ends of the teeth *e* that were uppermost during the backward movement of the shaft F′ are at the surface of the platform, and the pawl *j* again catches against the opposite shoulder *g* on the hub or boss *f′*. The shaft F′ therefore makes one-half of a revolution at each forward movement, and the teeth *e*, being thus turned, offer no obstruction to the cut grain as it passes upon the platform, owing to the direction in which the shaft is turned, the upper ends of the teeth moving over and forward toward the front end of the platform, so that the teeth cannot catch or act against the grain until they reach their lowest point and the shaft commences its backward movement.

This invention is extremely simple and efficient. It may be constructed at a small cost, and is not liable to get out of repair.

I am aware that vibrating and partly-rotating rods have been used before, and therefore I do not claim such rods, in themselves considered; but,

Having thus described my invention, what I claim as new, and desire to secure by Letters Patent, is—

The vibrating and intermittently-rotating shaft F', when fitted or placed in the bar E, and provided with teeth $e$, and operated by the wheel G', hubs $f f'$, pawls $h j$, cranks F G, and connecting-rod $d$, arranged substantially as shown and described, for the purpose set forth.

JAMES H. THOMPSON.

Witnesses:
JAMES F. BUCKLEY,
S. F. COHEN.